(12) United States Patent
Brinck et al.

(10) Patent No.: US 6,364,250 B1
(45) Date of Patent: Apr. 2, 2002

(54) SHELL COMPONENT FOR AN AIRCRAFT FUSELAGE AND METHOD OF MANUFACTURING THE SAME

(75) Inventors: Peter Brinck, Stade; Wilfried Mueller, Hamburg; Klaus P. Sanmann, Hamburg; Joerg Spitzner, Hamburg, all of (DE)

(73) Assignee: DaimlerChrysler Aerospace Airbus GmbH, Hamburg (DE)

( * ) Notice: Subject to any disclaimer, the term of this patent is extended or adjusted under 35 U.S.C. 154(b) by 0 days.

(21) Appl. No.: 09/406,463

(22) Filed: Sep. 27, 1999

(30) Foreign Application Priority Data

Sep. 25, 1998 (DE) .......................................... 198 44 035

(51) Int. Cl.[7] .............................................. B64C 1/00
(52) U.S. Cl. ...................................................... 244/119
(58) Field of Search ............................ 244/117 R, 119, 244/131, 123

(56) References Cited

U.S. PATENT DOCUMENTS

| | | | | |
|---|---|---|---|---|
| 3,976,269 A | * | 8/1976 | Gupta | 244/119 |
| 4,310,132 A | * | 1/1982 | Robinson et al. | 244/119 |
| 4,811,540 A | * | 3/1989 | Kallies et al. | 52/630 |
| 5,242,523 A | * | 9/1993 | Willden et al. | 156/285 |
| 5,251,849 A | * | 10/1993 | Torres | 244/117 R |
| 5,518,208 A | * | 5/1996 | Roseburg | 244/132 |
| 5,806,797 A | * | 9/1998 | Micale | 244/120 |
| 5,841,098 A | | 11/1998 | Gedrat et al. | |

FOREIGN PATENT DOCUMENTS

DE 19 639667 3/1998

* cited by examiner

Primary Examiner—Peter M. Poon
Assistant Examiner—Kevin Jakel
(74) Attorney, Agent, or Firm—W. F. Fasse; W. G. Fasse (57) ABSTRACT

A shell component for an aircraft fuselage includes a fuselage skin panel, a plurality of stringers extending in an aircraft lengthwise direction, and a plurality of frames extending crosswise relative to the stringers. The stringers and the frames are respectively welded onto the skin panel with the addition of a weld filler material. Each frame includes a frame root portion and a frame profile portion connected to each other. The frame root portion has cut-out notches receiving the stringers passing therethrough. The frame root portion is welded to the skin panel at the areas between the cut-out notches, and may be welded to the respective stringer in each cut-out notch. The stringers and frames are fabricated from webs and flanges, whereby a premanufactured grid of flanges may be used. The result is a very strong, yet simple shell component structure, that may be manufactured with a simple welding process, at a low cost and with low effort.

20 Claims, 6 Drawing Sheets

SHELL COMPONENT FOR AN AIRCRAFT FUSELAGE AND METHOD OF MANUFACTURING THE SAME

PRIORITY CLAIM

This application is based on and claims the priority under 35 U.S.C. §119 of German Patent Application 198 44 035.9, filed on Sep. 25, 1998, the entire disclosure of which is incorporated herein by reference.

FIELD OF THE INVENTION

The invention relates to a shell component for an aircraft fuselage comprising at least one metal skin sheet or panel, a plurality of stringers extending in the aircraft lengthwise direction, and a plurality of frame members extending crosswise relative to the stringers, i.e. in a direction generally circumferentially around the aircraft lengthwise direction. A welding supplemental or filler material is provided on the fuselage skin in the area of the connections between the stringers and the skin, and the stringers are welded onto the fuselage skin in these areas.

BACKGROUND INFORMATION

In the field of aircraft construction it is presently typical to use riveting or adhesive bonding for joining the fuselage skin panels onto the stringers to fabricate respective fuselage shell components. The assembly and connection of the frames is carried out in a subsequent fabrication step, for which angled mounting elements, particularly so-called clips, are riveted onto the stringers. The clips then serve to connect the frames onto the stringers. In view of such a multistep process, the present conventional fabrication of structural components such as fuselage shell components comprising plural skin-stringer-frame connections entails a rather high expense and effort with respect to the materials and the assembly work that is required. Moreover, the resulting structure has a relatively high weight.

It is a constant and important goal in the development of new aircraft structures to achieve a weight reduction and a cost reduction in the finished aircraft fuselage component. For these reasons, it is necessary to depart from the traditional joining methods using riveting, adhesive bonding, and mechanical mounting clips, and instead to develop an improved joining method that can realize the desired weight reduction and cost reduction.

German Patent 196 39 667 and corresponding U.S. Pat. No. 5,841,098 (Gedrat et al.) disclose a method for welding profiles or sectional members onto large-format aluminum structural components using laser beams to carry out the welding. Such aluminum structural components that are assembled in a skin-stringer manner can be used for the manufacture of an aircraft fuselage. However, there is still room for improvement in the particular structural arrangement and method of assembling the various parts, and especially the crosswise frames and lengthwise stringers, to achieve a simplified, lighter, and more economical aircraft fuselage structure.

SUMMARY OF THE INVENTION

In view of the above, it is an object of the invention to provide an improved shell component for an aircraft fuselage comprising frames, stringers, and skin panels, which can be simply and directly joined together by means of welding. It is also an object of the invention to provide an improved fabrication process using welding to join together the several parts of the shell component. The invention further aims to avoid or overcome the disadvantages of the prior art, and to achieve additional advantages, as apparent from the present specification.

The above objects have been achieved according to the invention in a shell component for an aircraft fuselage comprising at least one skin panel (e.g. of metal), a plurality of stringers extending in the lengthwise direction of the aircraft, and a plurality of frames extending crosswise or circumferentially relative to the aircraft lengthwise direction, i.e. crosswise relative to the stringers. The skin panel is provided with a welding supplement or filler material in the area of each joint between the skin panel and the stringers, and the stringers are welded to the skin panel at these areas.

Particularly, according to a first embodiment of the invention, a welding supplement or filler material is additionally provided on the skin panel in the area of each joint between the skin panel and the frames, which are also welded to the skin panel. The frames each respectively comprise a frame root portion and a frame profile portion that are ultimately connected to each other. The frame root portion has notches or cut-outs therein and the stringers extend through these notches. A welded connection is provided between the skin panel and each frame root at locations between the respective notches.

According to a second embodiment of the invention, a welding supplement or filler material is also provided on the skin panel in the area of each connection between the skin panel and the frames. In this embodiment, the stringers are respectively embodied as stringer webs. A stringer-frame grid made up of stringer flanges and frame flanges is provided, wherein the stringer flanges are connected to the stringer webs by respective weld joints. The frames are respectively formed of a one-piece or unitary frame element which essentially comprises a frame web and a root portion provided with cut-outs or notches. The frame element is arranged with the root portion in contact on the skin panel and with the frame web lying on the face of the frame flange. The root portion of each frame element is welded to the skin panel.

According to a third embodiment of the invention, a welding supplement or filler material is also provided on the skin panel in the area of each connection between the skin panel and the frames. The stringers are respectively embodied as stringer webs, while the frames respectively comprise a frame web and a frame head. The stringer webs and the frame webs are welded onto the skin panel in the area of the grid pattern provided with the welding filler material. A stringer-frame grid made up of stringer flanges and frame flanges is provided, whereby the stringer flanges are welded to the stringer webs and the frame flanges are welded to the frame webs, by means of respective weld joints. Each respective frame head is arranged and joined onto the respective frame flange by means of another weld joint.

The above objects have further been achieved by methods according to the invention for fabricating a shell component for an aircraft fuselage. A method of fabricating the shell component according to the first embodiment involves the following steps: a welding filler material is applied to the skin panel at the areas of the joints between the skin panels and the stringers as well as the frames; the stringer webs are welded onto the skin panel; each frame root portion is welded onto the stringer-strengthened skin panel; and each frame profile portion is welded onto the frame root portion.

A method of fabricating the shell component according to the second embodiment of the invention comprises the following steps: a welding filler material is applied onto the skin panel at the connection locations between the skin panel and the stringer webs as well as the frame elements; the stringer webs are welded onto the skin panel; the stringer flanges of the stringer-frame grid are welded onto the stringer webs by means of I-joints; the root portions of the frame elements are joined onto the skin panel by welded joints, preferably formed as double fillet joints; and the frame webs of the frame elements are joined onto the faces of the frame flanges by means of welded joints, preferably formed as single-bevel butt weld joints.

A method of fabricating the shell component according to the third embodiment of the invention comprises the following steps: a welding filler material is applied to the skin panel at the connection locations between the skin panel and the stringer webs as well as the frame elements; the stringer webs and the frame webs are welded onto the skin panel in the area of the welding filler material, whereby the stringer webs and the frame webs form a web grid; the stringer flanges and the frame flanges of the stringer-frame grid are welded onto the stringer webs and the frame webs respectively by means of I-joints; and the frame heads are welded onto the respective frame flanges by means of welded joints, preferably double fillet joints.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figures 1, 2:
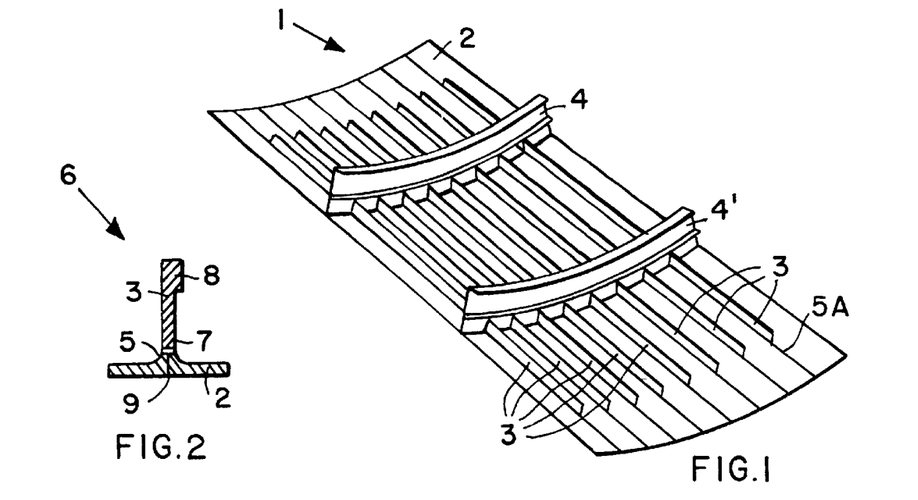
FIG. 1 is a schematic perspective view of a finished shell component for an aircraft fuselage according to a first embodiment of the invention.
FIG. 2 is a cross-sectional detail view of a skin panel-stringer joint of the first embodiment of the shell component.

FIG. 1 shows a shell component 1 for an aircraft fuselage. A complete fuselage will essentially consist of a plurality of fuselage sections, which in turn each respectively consist of a plurality of prefabricated shell components 1 connected to each other. The prefabricated shell component 1 according to a first embodiment as shown in FIG. 1 essentially consists of a pre-curved or pre-formed skin sheet or panel 2 that is provided with stringers 3 extending in the lengthwise direction of the aircraft for strengthening the skin panel 2. Frames 4 and 4' are arranged extending crosswise relative to the stringers 3, i.e. substantially circumferentially relative to the lengthwise direction of the aircraft, whereby the respective frames 4 and 4' are spaced apart from each other in the aircraft lengthwise direction. The frames 4 and 4' serve to introduce and carry the loads from the control surfaces and empennage and the like into the aircraft fuselage.

In the illustrated first embodiment, both the stringers 3 and the frames 4 and 4' are welded to the skin panel 2. To facilitate the welding, the skin panel 2 is plated on one surface thereof with a plating layer of a welding supplement or filler material. Moreover, the skin panel 2 must consist of a weldable structural material, such as an AlMgSi alloy or an AlLi alloy, for example.

Since the welding filler material is only needed in the contact areas where the stringers 3 and the frames 4 and 4' are welded to the skin panel 2, the welding filler material can either be applied in such a limited or bounded pattern or can be applied as a continuous film layer over the surface of the skin panel 2 and then the unneeded excess material can be removed, for example by a chemical cleaning or etching process. The resulting pedestal beads 5 of welding filler material form a grid pattern 5A on the skin panel 2 as shown in FIG. 2. Such a deposit of welding filler material is necessary for achieving a trouble-free formation of the weld joints without cracking and the like. A suitable welding filler material may be AlSi12, for example.

Any other known method of applying the weld supplement or filler material to the locations where the welding is to be carried out on the skin panel could alternatively be used. For example, it is alternatively possible to supply the supplemental or filler material during the welding process, for example by means of a wire feed arrangement. A further possibility is to use a combination of the pre-application of a deposit of weld filler material together with the supply of a wire-form filler material during the welding process.

In order so that the contour of the skin panel 2 corresponds to the subsequent intended contour of the shell component for the fuselage, the sheet metal of the skin panel 2 is deep drawn. The side of the sheet metal provided with the welding filler material, which will ultimately be the inner surface of the skin panel, must be oriented lying in contact on the deep drawing block or die. Then the sheet metal is deformed in the direction of the frames, and also in the direction of the stringers in the case of spherically formed components.

The subsequent operations or steps for fabricating the connection between the skin, the stringers, and the frames will now be described with reference to FIGS. 2 to 5. FIG. 2 shows a sectional view of a detail area of a connection 6 between the skin panel 2 and stringer 3. In a first step, the lengthwise extending stringers 3 are welded onto the skin panel 2. Each stringer 3 is preferably embodied as an extruded semi-finished part having a hammerhead profile 8 extending along a stringer web 7. The stringer 3 is arranged so that the stringer web 7 stands perpendicularly on the skin panel 2 and particularly on the pedestal bead 5 of weld filler material provided on the skin panel 2. The joint plane 9 between the skin panel 2 and the stringer 3 is defined on the one hand by the top surface of the pedestal bead 5 of welding filler material and on the other hand by the bottom edge face of the stringer web 7, i.e. the edge face of the stringer web 7 opposite from the hammerhead profile 8. A $CO_2$ laser beam welding apparatus is preferably used for welding the stringer web 7 onto the skin panel 2. Before carrying out the welding, the stringer 3 is properly located and then fixedly pressed against the skin panel 2 by a suitable pressing or clamping arrangement, which is not shown here, but which may be similar to the arrangement 27 shown in FIG. 7. The welding operation preferably forms the joint as a double fillet joint or a double-bevel butt weld joint.

Figure 3:
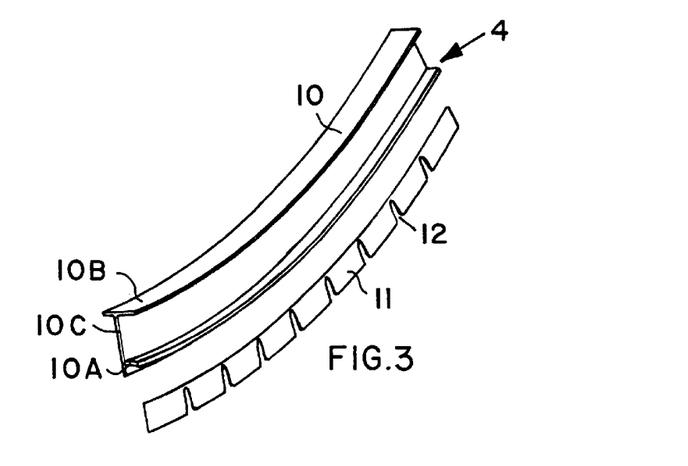
FIG. 3 is an exploded view of a frame for the shell component of the first embodiment.

FIG. 3 shows an exploded view of a frame 4 by itself. The frame 4 consists of a frame profile 10 and a frame root member 11. In order to provide good accessibility for forming the required welded joints, the frame 4 is preferably initially separated into individual components, i.e. the frame profile 10 and frame root member 11. The frame profile 10 comprises an outer flange 10A and an inner flange 10B connected to each other by a web 10C. The inner flange 10B is formed as a T-profile onto the web 10C, while the outer flange 10A has an L-profile shape relative to the web 10C. Alternatively, the inner flange 10B may also have an L-profile shape. The frame root member 11 essentially consists of a web or plate of material with cut-outs or notches 12 spaced apart from each other in the circumferential direction of the aircraft at a spacing distance corresponding to the spacing between successive ones of the stringers 3. Each respective notch 12 serves as a pass-through opening which receives a respective one of the stringers 3 passing therethrough in the final assembled condition.

Figures 4A, 4B:
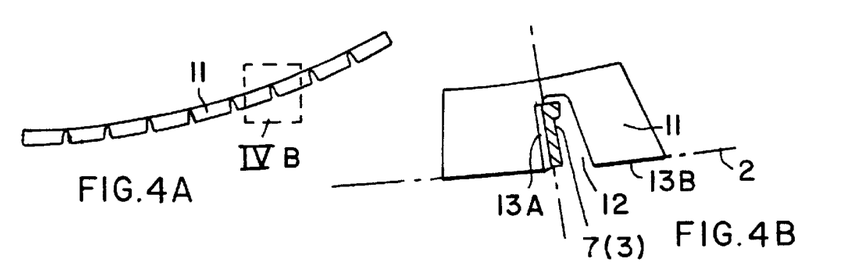
FIG. 4A is a side view of the root portion of the frame by itself.
FIG. 4B is an enlarged detail side view of a part of the root portion of the frame, connected to a respective stringer.

FIG. 4A shows the frame root member 11 by itself, while FIG. 4B shows the detail area around a single notch 12 in the frame root member 11. As shown in FIG. 4B, the frame root member 11 is arranged so that an edge thereof provided with the notches 12 rests flushly against the skin panel 2, while the respective stringers 3 are received in and pass through the notches 12. The frame root member 11 is welded to the skin panel 2 along a weld joint 13B, and is also joined by a weld joint 13A to the side face of the stringer web 7 opposite the side face on which the hammerhead profile 8 protrudes.

The final curvature of the shell component is preferably taken into account when laying out the configuration of the cut-out notches 12, so that the contact edge of the notch 12 will be in flush contact or at least parallel and in close proximity to the side face of the stringer web 7 along the intended weld joint 13A. As an alternative, the notches 12 may have a trapezoidal shape, whereby the stringer web 7 passes through the notch 12 with a clearance on all sides, i.e. without establishing direct contact with the frame root member 11. In such a case, the frame root member 11 would only be welded to the skin panel 2 along the weld joint 13B, and an additional stringer support angle could be provided to support the perpendicular standing orientation of the stringer 3.

Figure 5:
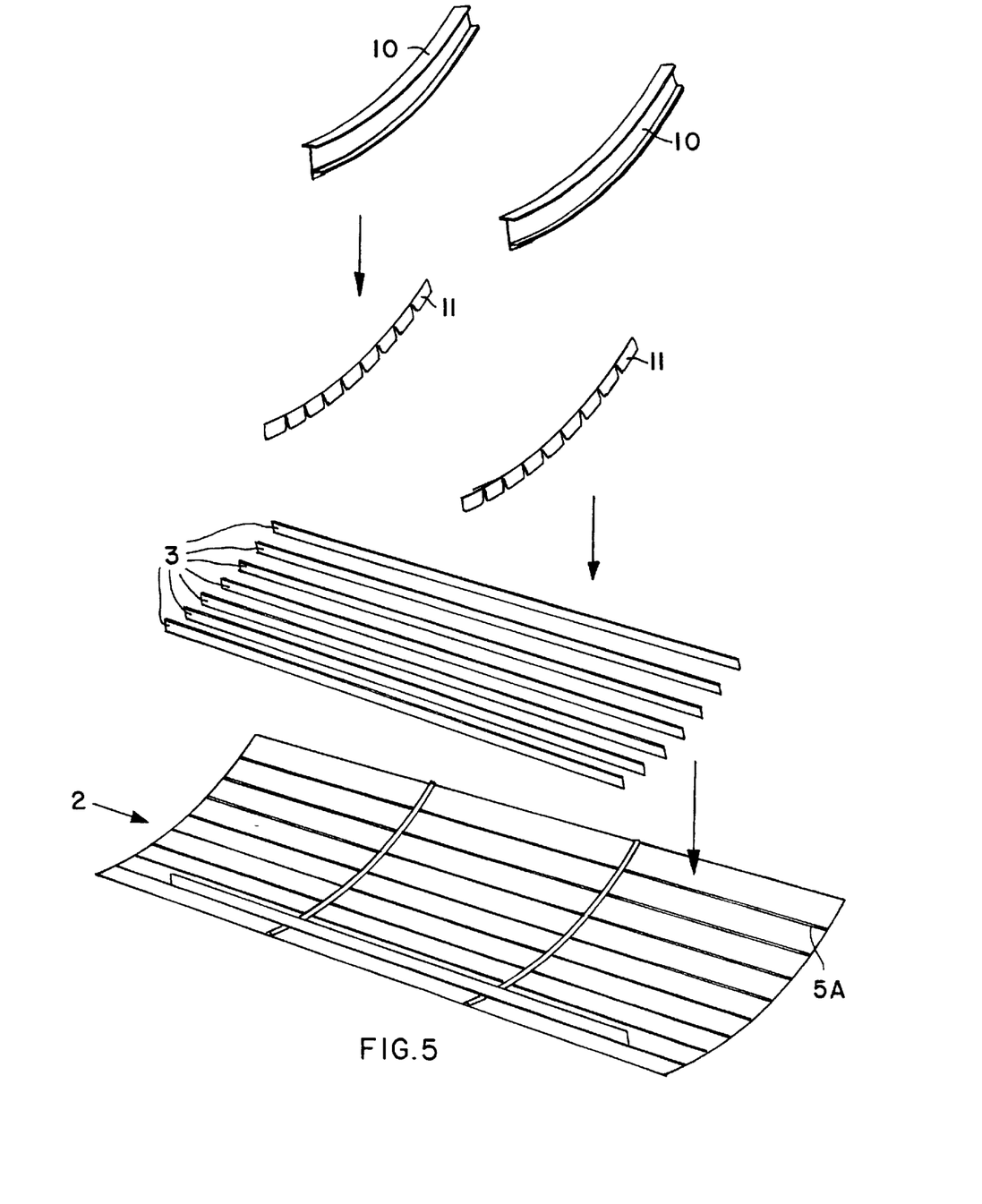
FIG. 5 is an exploded view of the shell component of the first embodiment as shown in FIG. 1.

FIG. 5 shows an exploded view of the above described shell component 1 of the first embodiment. The assembly sequence for fabricating the shell component 1 can be described in connection with this exploded view of FIG. 5. In the first fabrication step, a grid pattern 5A of weld filler material is provided on the preformed skin panel 2 in a manner that has been described in detail above. Next, the stringers 3 are welded onto the skin panel 2 in such an arrangement that the lengthwise extending pedestal beads 5 of the weld filler material in the grid pattern 5A form the joint surfaces for the respective welded joints 6 between the skin panel 2 and the stringers 3 as described above in connection with FIG. 2. Thereafter, the frame root members 11 are placed into proper positions and are then welded onto the skin panel 2 and onto the stringer webs 7 of the stringers 3 as has been described above in connection with FIG. 4.

As the next step, the frame profile members 10 will be welded onto the frame root members 11, preferably by a two-sided or a one-sided butt welded joint. Each frame profile member 10 may have been prefabricated by any known method, or by different methods respectively. One possibility is that the frame profile member 10 is fabricated as a stretch-formed extruded profile semi-finished part, or that it is fabricated of several different components that are welded or riveted together, for example. For reasons of strength and stability, the frame profile member 10 has an outer flange 10A extending continuously in the aircraft circumferential direction as described above, and this outer flange 10A is welded onto the free edge of the frame root member 11.

Figures 6, 7:
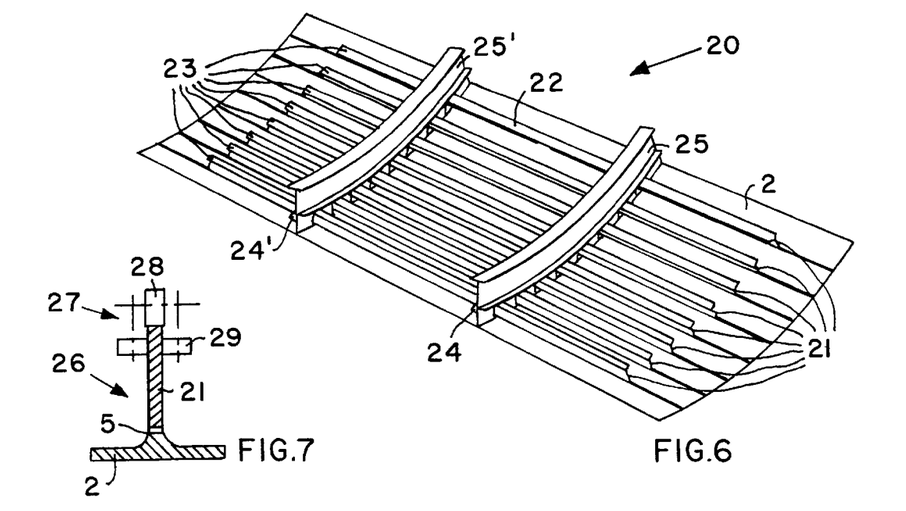
FIG. 6 is a schematic perspective view of a finished shell component according to a second embodiment of the invention.
FIG. 7 is a cross-sectional view of a skin panel-stringer web connection of the second embodiment of the shell component.

FIG. 6 shows a completely assembled shell component 20 for an aircraft fuselage, according to a second embodiment of the invention. This shell component 20 essentially consists of a preformed skin panel 2, lengthwise extending stringer webs 21 welded onto the skin panel 2, and frame members as will be described below. The stringer webs 21 must have a curvature or contour in the lengthwise direction that matches the contour of the skin panel 2 in order to maintain a minimal spacing, or preferably a uniform contact between the respective contact surfaces of the skin panel 2 and the stringer webs 21. For this purpose, the stringer webs 21 can be cut particularly to have the proper contour, without requiring any subsequent machining or other shaping steps. Alternatively, the stringer webs may be formed from pre-cut blanks that initially have a straight cut contour, but are then deformed by stretch-forming in order to have the finished contour corresponding to the contour of the skin panel 2.

A stringer-frame grid 22 is then welded onto the top edges of the stringer webs 21. The stringer-frame grid 22 comprises stringer flanges 23 that are welded onto the stringer webs, and frame flanges 24 and 24' extending crosswise relative to the stringer flanges. Frame elements 25 and 25' are arranged in the crosswise direction of the shell component 20 along the frame flanges 24. The individual steps for fabricating the finished shell component 20 will now be described in connection with FIGS. 7 to 11.

FIG. 7 shows a connection 26 between the skin panel 2 and a stringer web 21. The stringer web 21 stands perpendicularly on the skin panel 2 with a pedestal bead 5 of welding filler material provided on the fuselage skin 2 at the proper connection locations at which the stringer webs 21 will be welded. A pressing or clamping arrangement 27 comprising a pressing or clamping roller 28 and a roller pair 29 for guiding and positioning the stringer web 21 are used to properly position the stringer web 21 and secure the stringer web 21 to the skin panel 2 during the welding operation. The welding of the stringer web 21 onto the skin panel 2 is achieved by means of a $CO_2$ laser welding device or a solid state laser welding device, which operates with a high joint advance velocity or feed rate. The welded joint is preferably formed as a double fillet joint or a double-bevel butt weld joint.

Figure 8:
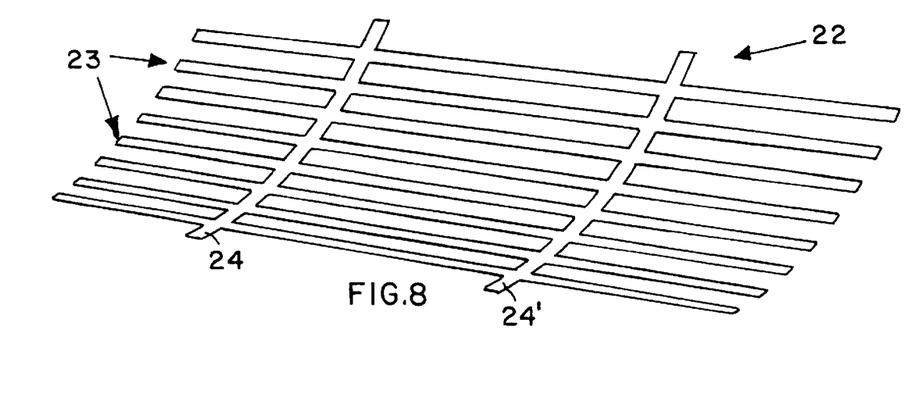
FIG. 8 is a perspective view of a stringer-frame grid of the shell component according to the second embodiment.

FIG. 8 shows the stringer-frame grid 22 by itself. A plurality of lengthwise extending stringer flanges 23 and crosswise extending frame flanges 24 and 24' form the grid 22. The stringer-frame grid 22 may preferably be stamp-cut or otherwise cut out of the intermediate semifinished part comprising a sheet metal panel having a weld filler material plated onto one surface thereof. For example, the starting point for forming the stringer-frame grid 22 can be the same type of material as the starting material for the fuselage skin panel 2. The sheet metal panel is drawn to the extent needed, whereby the side of the sheet metal panel provided with the welding filler material is oriented to face away from the deep drawing block. The panel is then deformed corresponding to the geometry of the shell component 20 in both the stringer direction and the frame direction. The contour of the sheet metal panel for the stringer-frame grid 22 must correspond to the contour of the skin panel 2 in order to achieve a parallel or uniform joint plane between the stringer web 21 and the stringer flange 23 respectively. After the sheet metal panel has been formed in this manner, the grid 22 itself is cut out of the sheet metal panel. By using such a stringer-frame grid 22 according to the invention, it is achieved that the stringer web 21 and the stringer flange 23 can then be welded to each other in a single welding process, without the welding process being hindered or interrupted by components crossing each other.

Figure 9A:
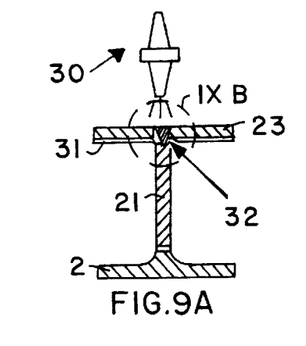
FIG. 9A is a cross-sectional view of the connection between the skin panel, the stringer web, and the stringer flange in a shell component according to the second embodiment.

FIG. 9A shows the cross-section of the above mentioned welded connection between the stringer web 21 and the stringer flange 23. Specifically, a laser welding device 30 is used to penetration-weld directly through the stringer flange 23 into the stringer web 21. Weld supplement or filler material 31 has been applied on the bottom surface of the stringer flange 23 and is available at the welding joint location. The welded joint 32 formed at this location is preferably an I-joint as shown in the detail view of FIG. 9B.

Figure 10:
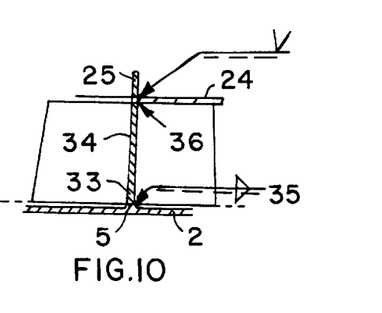
FIG. 10 is a cross-sectional view of the connection between the skin panel, the frame flange, and the frame root in a shell component according to the second embodiment.

FIG. 10 is a cross-sectional view showing the connection between the skin panel 2, the frame flange 24, and a frame element 25. The frame element 25 is a separate prefabricated component that essentially consists of a root portion 33 and a frame web 34. The root portion 33 is perpendicularly set onto the pedestal bead 5 of weld material and is then welded to the skin panel 2 by a double fillet weld joint or a double-bevel butt weld joint. To prepare for this step, a pedestal bead 5 of the weld filler material has been provided on the skin panel 2 at the corresponding joint location at which the root portion 33 is to be welded. Furthermore, the frame element 25 is welded to the frame flange 24. This connection between the face of the frame flange 24 and the frame web 34 of the frame element 25 is preferably embodied as a single-bevel butt weld joint 36. The face of the frame flange 24 in this embodiment is provided as a stop, contact and connection or joint surface for the frame element 25. The configuration of the frame element 25 with notches 37 in the root portion 33 as well as a stiffening flange 38, for enabling the above described welded connections, is shown further in FIG. 11, and will be described in more detail below.

Figure 11:
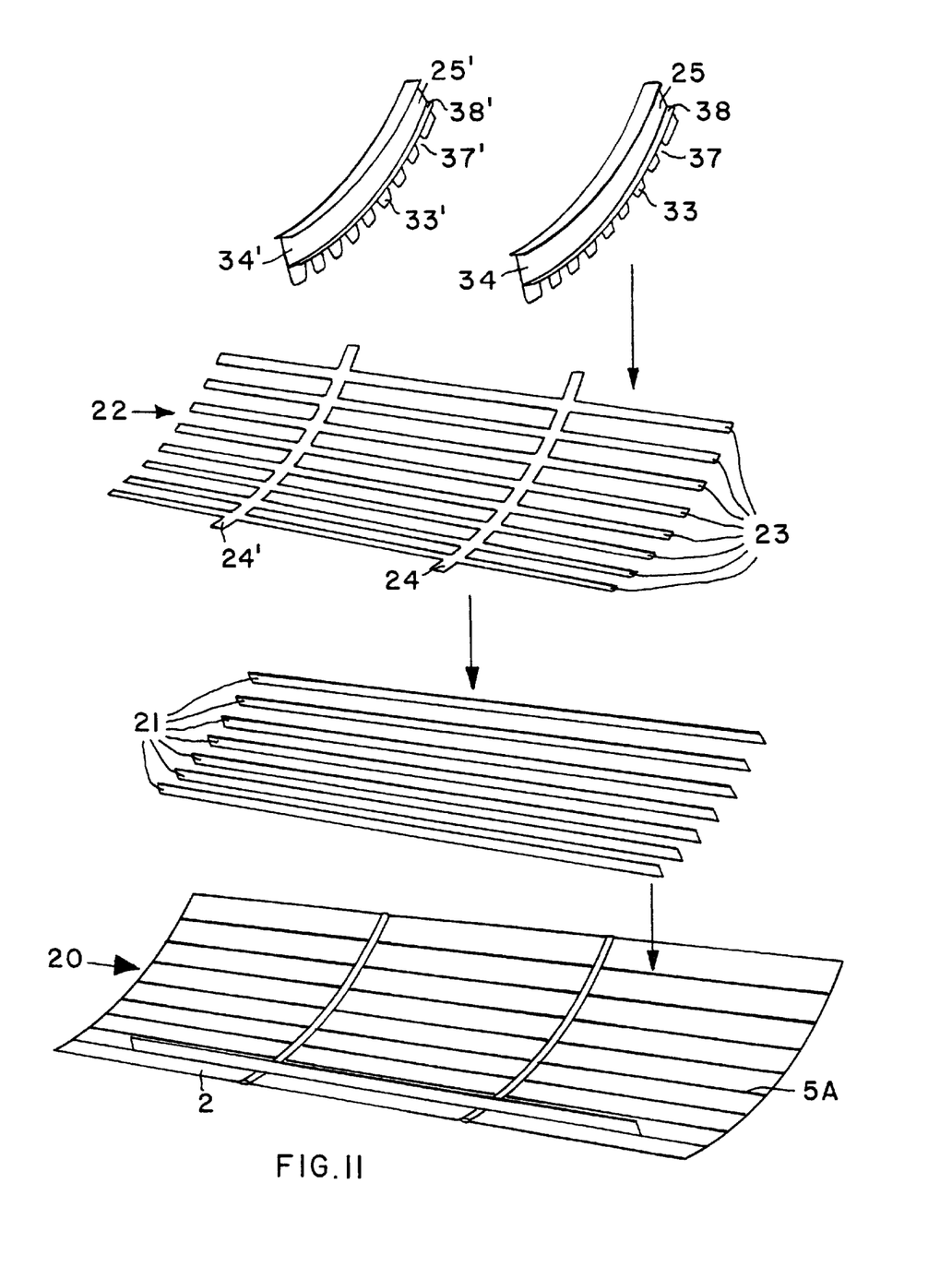
FIG. 11 is an exploded view of the shell component according to the second embodiment as shown in FIG. 6.

FIG. 11 is an exploded view of the shell component 20 according to the second embodiment. The assembly sequence for fabricating the shell component 20 will be described in connection with this exploded view illustration. The initial preparation of the skin panel 2 and the connection or joint between the skin panel 2 and the stringer webs 21 is carried out in the same manner as the fabrication of the shell component 1 of the first embodiment which has been fully described above.

In a first step, a grid pattern 5A of welding filler material is provided on the skin panel 2. The stringer webs 21 are welded onto the preformed skin panel 2, whereby the lengthwise extending pedestal beads 5 of weld filler material of the grid pattern 5A form the contact surfaces for these joints. After the skin panel-stringer connection 26 has been formed as just described and as shown in FIG. 7, a stringer-frame grid 22 is welded onto the stringer webs 21 as has been described in detail in connection with FIG. 9 above.

As the next step, the root portions 33 and 33' of the frame elements 25 and 25' are welded to the stringer strengthened skin panel 2 at the prescribed locations. In order to achieve this, the root portions 33 and 33' must have openings or notches 37 and 37' provided therein, which allow sufficient space for the stringer flanges 23 and the stringer webs 21. The stringer openings or notches 37 preferably have a trapezoidal shape. Then, the frame elements 25 and 25' are welded along the frame webs 34 and 34' to the corresponding faces of the frame flanges 24 and 24'.

In order to achieve a greater strength and stability, it may be necessary or desired to additionally provide a stiffening flange 38 or 38' along the frame element 25 or 25'. The separately prefabricated frame element 25 may be manufactured by means of various methods. For example, the frame element 25 may be fabricated as a stretch-formed extruded profile member or as a milled member as a semi-finished intermediate part, or instead it can be fabricated from separate parts by means of welding or riveting.

Figure 12A:
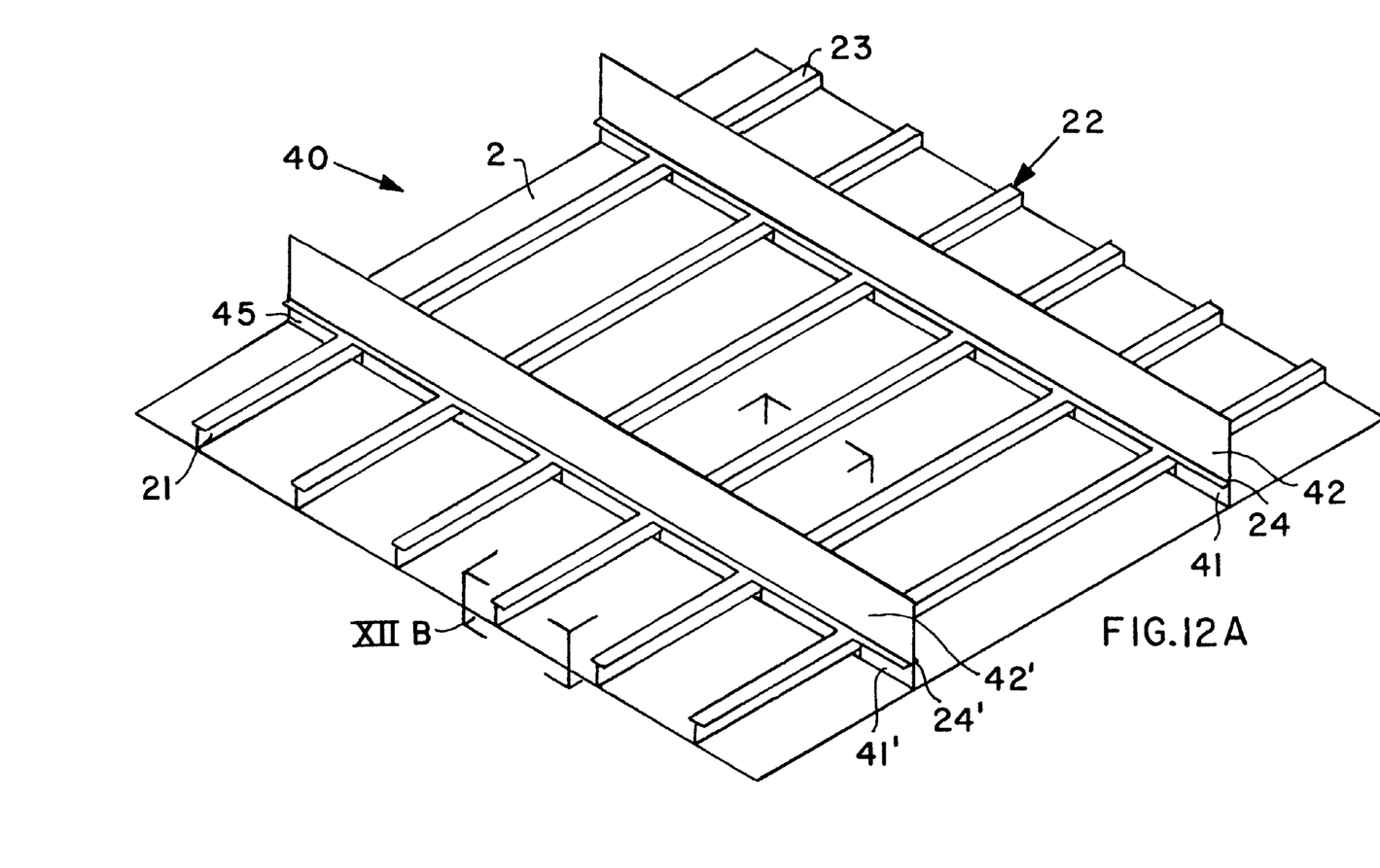
FIG. 12A is a schematic perspective view of a shell component according to a third embodiment.

FIG. 12A shows a perspective view of a shell component 40 according to a third embodiment of the invention. The shell component 40 is a variant of the above described second embodiment, in that this third embodiment also makes use of a stringer-frame grid 22 advantageously providing a continuous welded joint. For this reason, the weld seams for each respective stringer flange 23 or frame flange 24 or 24' can be fabricated in a single welding process, which reduces the fabrication time and costs.

While the example of a shell component 40 shown in FIG. 12 is illustrated without a spherical curvature for the sake of simplicity, it is alternatively possible that this shell component would have a curvature in the stringer direction and/or in the frame direction. The particular curved contour of the shell component will simply depend at which location or area of the aircraft fuselage the shell component 40 is to be used. Therefore, reference is made to FIGS. 7 to 9 and the corresponding description, because the features of the shell component shown in these figures also apply to the shell component 40 shown in FIG. 12A.

Figure 9B:
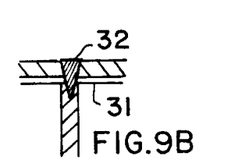
FIG. 9B is an enlarged detail view of the detail area IXB of the arrangement in FIG. 9A.

In addition to the stringer webs 21, the shell component 40 further comprises frame webs 41 and 41' which must similarly be welded onto the skin panel 2 before the stringer-frame grid 22 can be joined onto the structure being fabricated. The stringer webs 21 and frame webs 41 and 41' together form a web grid 45. Since the required weld joints of the stringer webs 21 and of the frame webs 41 and 41' relative to the stringer-frame grid 22 lie along a common welding plane, the same penetration welding technique and the same welding apparatus described above in connection with FIG. 9 can also be used for welding through the stringer flanges 23 and frame flanges 24 into the stringer webs 21 and the frame webs 41 and 41'.

Figure 12B:
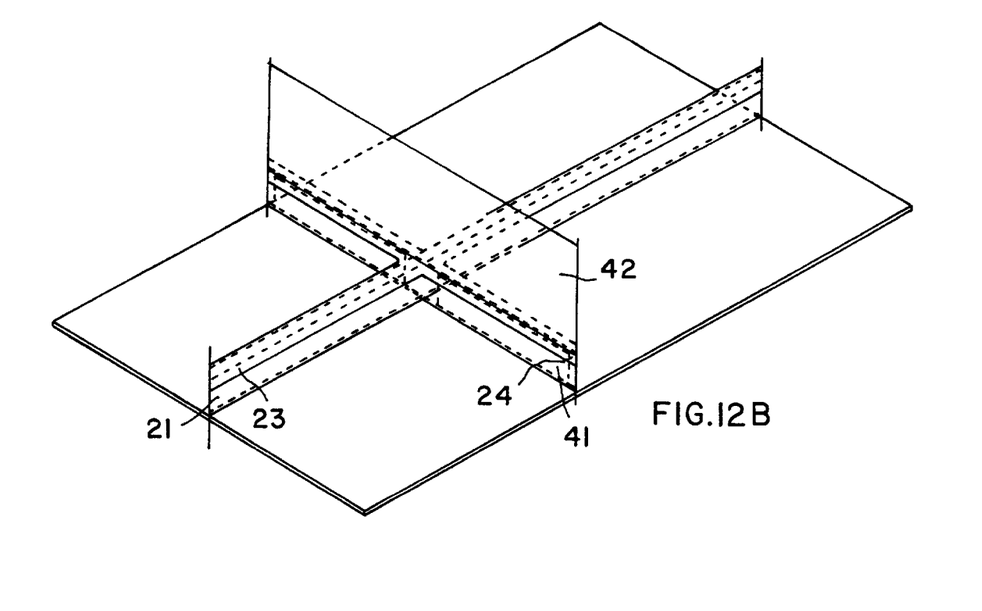
FIG. 12B is an enlarged detail view of the detail area XIIB shown in FIG. 12A.

In contrast to the second embodiment of the shell component 20, the present third embodiment of the shell component 40 does not use a one-piece frame element 25 or 25' that is laterally welded onto the face of the frame flange 24. Instead, the corresponding frame element has been separated into a frame web 41, 41' and a frame head 42, 42' which are respectively symmetrically arranged below and above the frame flange 24. FIG. 12B shows an enlarged perspective detail view of the detail area 12B of the shell component 40 of FIG. 12A. This detail view of FIG. 12B especially shows the stringer web 21, the frame web 41, the stringer flange 23, and the frame flange 24. The frame head 42 is symmetrically arranged on the frame flange 24.

Figure 13A:
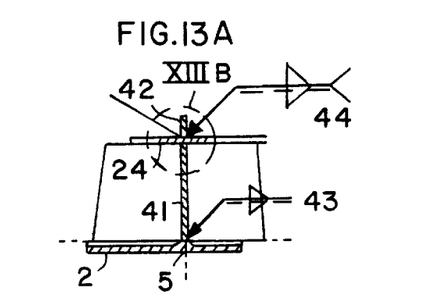
FIG. 13A is a cross-sectional view of the connection between the skin panel, the frame flange, and the frame root in the third embodiment of a shell component.
Figure 13B:
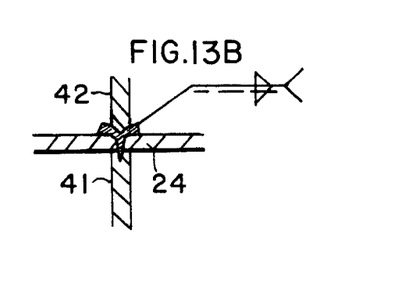
FIG. 13B is an enlarged detail view of the detailed area XIIIB shown in FIG. 13A.

FIGS. 13A and 13B show a cross-section of a portion of the shell component 40, as seen in the direction along a frame web 41, to particularly illustrate the welded joint 43 between the skin panel 2 with the welding filler material pedestal bead 5 provided thereon, and the frame web 41. This welded joint is preferably embodied as a double fillet weld joint or a double bevel butt weld joint. The frame flange 41 is welded onto the frame web 24 with an I-joint. In turn, the frame head 42 is symmetrically arranged on the frame flange 24 and is welded onto the frame flange 24 preferably by a double fillet joint or a double bevel butt joint 44, as particularly shown in the detail view of FIG. 13B. It should be noted that in FIGS. 10, 13A and 13B the exemplary types of weld joints are symbolically indicated by corresponding drawing symbols.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A shell component for an aircraft fuselage comprising:
    a fuselage skin panel fabricated of a weldable aluminum alloy;
    a plurality of stringer webs that are spaced apart from each other, respectively extend in a longitudinal direction along said fuselage skin panel, and are welded respectively by a first continuous weld joint onto said fuselage skin panel;
    a plurality of frame webs that are spaced apart from each other, respectively extend in a crosswise direction relative to said longitudinal direction, and are welded respectively by a second continuous weld joint onto said fuselage skin panel;
    a stringer-frame grid comprising stringer flanges extending in said longitudinal direction and frame flanges extending in said crosswise direction, wherein said stringer flanges are respectively welded onto said stringer webs by respective third continuous weld joints and said frame flanges are respectively welded onto said frame webs by respective fourth continuous weld joints; and
    a plurality of frame heads welded onto said frame flanges opposite said frame webs by respective fifth continuous weld joints.

2. The shell component according to claim 1, further comprising a welding filler material provided in a grid pattern between said stringer webs and said fuselage skin panel and between said frame webs and said fuselage skin panel.

3. The shell component according to claim 2, consisting of said fuselage skin panel, said stringer webs, said frame webs, said stringer-frame grid, said frame heads, and said welding filler material.

4. The shell component according to claim 2, wherein said welding filler material is provided on said fuselage skin panel in the form of a pedestal bead of said welding filler material.

5. A method of fabricating the shell component according to claim 2, comprising the following steps:
    a) applying said welding filler material onto said fuselage skin panel at stringer joint locations and frame joint locations at which said stringer webs and said frame webs respectively are to be welded onto said fuselage skin panel;
    b) arranging and welding said stringer webs and said frame webs onto said fuselage skin panel at said stringer joint locations and said frame joint locations respectively, so that said stringer webs and said frame webs form a web grid;
    c) arranging said stringer-frame grid on said web grid, and welding said stringer flanges onto said stringer webs and welding said frame flanges onto said frame webs by respective welded I-joints; and
    d) arranging and welding said frame heads onto said frame flanges.

6. The method according to claim 5, wherein said step d) comprises welding said frame heads onto said frame flanges by respective double fillet joints.

7. The method according to claim 5, wherein said step a) comprises plating a continuous layer of said welding filler material onto said fuselage skin panel and then chemically removing said welding filler material from areas other than said stringer joint locations and said frame joint locations so as to leave said welding filler material at said stringer joint locations and said frame joint locations forming a grid pattern of said welding filler material on said fuselage skin panel.

8. The method according to claim 5, wherein said step a) comprises supplying and applying at least a portion of said welding filler material in the form of a wire during said welding in said step b).

9. The method according to claim 5, further comprising a preliminary step of deep drawing said fuselage skin panel to give said panel a curved contour in at least one of said longitudinal direction and said crosswise direction.

10. The method according to claim 9, further comprising another preliminary step of deep drawing said stringer-frame grid to have a curved contour matching said curved contour of said fuselage skin panel.

11. The method according to claim 5, wherein all of said welding is carried out as laser welding using a $CO_2$ laser device.

12. The method according to claim 5, wherein all of said welding is carried out as laser welding using a solid state laser device.

13. The shell component according to claim 1, wherein said weld joints between said stringer flanges and said stringer webs, and said weld joints between said frame flanges and said frame webs are respective I-joints.

14. The shell component according to claim 1, wherein each said frame head is arranged symmetrically on a respective one of said frame flanges.

15. The shell component according to claim 1, wherein said weld joints between said frame heads and said frame flanges are respective double fillet joints or double-bevel butt weld joints.

16. The shell component according to claim 1, wherein said stringer-frame grid is a one-piece integral component consisting of said stringer flanges and said frame flanges integrally formed with each other.

17. The shell component according to claim 1, wherein said stringer webs and said frame webs are each respectively a flat planar web member having a first lateral edge welded continuously to said fuselage skin panel and a second lateral edge welded continuously to a respective one of said stringer flanges and said frame flanges.

18. The shell component according to claim 17, wherein said frame heads are flat planar webs arranged respectively coplanar with said frame webs.

19. The shell component according to claim 1, wherein said fuselage skin panel, said stringer webs, said frame webs, said stringer-frame grid and said frame heads are each respectively fabricated of a respective weldable aluminum alloy.

20. A shell component for an aircraft fuselage consisting essentially of:

a fuselage skin panel;

a plurality of stringer webs that are spaced apart from each other, respectively extend in a longitudinal direction along said fuselage skin panel, and are welded onto said fuselage skin panel;

a plurality of frame webs that are spaced apart from each other, respectively extend in a crosswise direction relative to said longitudinal direction, and are welded onto said fuselage skin panel;

a stringer-frame grid comprising stringer flanges extending in said longitudinal direction and frame flanges extending in said crosswise direction, wherein said stringer flanges are respectively welded onto said stringer. webs by respective weld joints and said frame flanges are respectively welded onto said frame webs by respective weld joints;

a plurality of frame heads welded onto said frame flanges by respective weld joints; and a welding filler material provided in a grid pattern between said stringer webs and said fuselage skin panel and between said frame webs and said fuselage skin panel.

* * * * *